Sept. 15, 1936.   H. J. LITTLE ET AL   2,054,703

PIPE OR TUBING AND MANUFACTURE OF SAME

Filed March 28, 1935

INVENTORS
Howard J. Little.
George W. Hines.
BY
ATTORNEY.

Patented Sept. 15, 1936

2,054,703

UNITED STATES PATENT OFFICE 2,054,703

PIPE OR TUBING AND MANUFACTURE OF SAME

Howard J. Little, Fort Thomas, Ky., and George W. Hines, Cincinnati, Ohio, assignors to The Newport Culvert Company, a corporation of Delaware Application March 28, 1935, Serial No. 13,494

20 Claims. (Cl. 29—156)

This invention relates to novel and improved conduit tubes or pipes and the manufacture of same, and particularly relating to the manufacture of tubes or pipes which are too small in diameter to permit circumferentially disposed strengthening corrugations.

Tubes or pipes manufactured from flat sheets of sheet metal and the like do not have sufficient strength to prevent them from collapsing during the back filling of the earth in which they are placed or after they have been put in place, and they have commonly been corrugated with the corrugations circumferentially disposed to strengthen and reinforce them. When the pipes or tubes are of relatively large diameter this method of reinforcing and strengthening is feasible, but it is not so with the tubes or pipes of relatively small diameter such as from about 4 to 6 inches. For instance, a tube or pipe circumferentially corrugated with corrugations of approximately one-half inch depth would have an outside diameter, meaning the diameter through the tops of the outside corrugations, more than one inch greater than the inside diameter, meaning the diameter through the tops of the inside corrugations. This difference in the outside and inside diameters while being of no moment in pipes or tubes of relatively large diameters is of considerable moment in those of small diameters, for there the resulting stretch of the metal at the top of the corrugations is so great that the protective coating at those points is cracked and in many cases peeled off.

Also where the pipes or tubes are to be laid end to end, one end thereof is enlarged to provide a slip joint for mating same with the opposite end of similar pipes.

These enlarged ends in sheet metal pipes or tubes have heretofore been formed by impinging a swaging tool thereagainst to enlarge the parts of the end all at one time but the pipe or tube yields or stretches at the seam when the swaging tool is projected thereagainst and springs back into place when it is withdrawn, thereby causing the enlarged end to be only partially or incompletely enlarged.

The aim of the present invention is to provide tubes or pipes which are sufficiently reinforced without the need of circumferentially disposed corrugations and also to effect a swage at the end of the tubes or pipes so that the embossment is formed without any yielding of the pipes at their seams. This swaging is effected by rolling means which is impinged against the portion or portions of the pipe or tube desired to be swaged. This swaging may be carried out either before or after the pipe or tubes are formed. The reinforcement of the pipes or tubes is provided by overlapping the abutting edges with tongues and recesses adapted to interengage. The edges of the blank from which the pipe or tube is fabricated are formed with suitably spaced tongues and recesses so that opposite ends of the blank may be bent to bring them in abutting relation with the tongues and grooves fitted together to provide a reinforced seam.

For a better understanding of the invention reference may be made to accompanying drawing in which.

Figure 1:
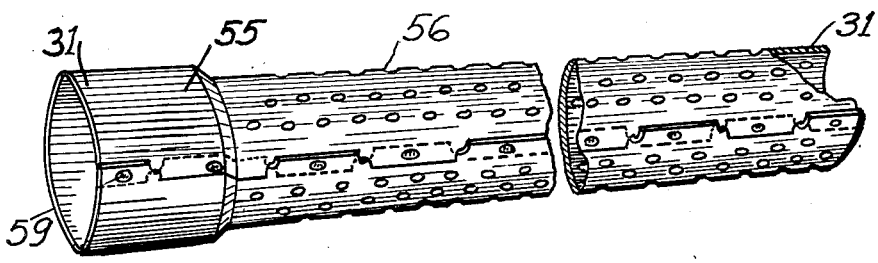
Figure 1 is a perspective view of pipe or tube embodying the present invention.

Referring to the drawing in which like numerals are used to designate like parts, numeral 31 designates a tube or pipe that may be fabricated from a blank of any suitable material such as sheet metal or the like. It may be of any length and diameter, but as above stated, the hereinafter described structure is particularly suitable for those having a relatively small diameter.

Figure 2:
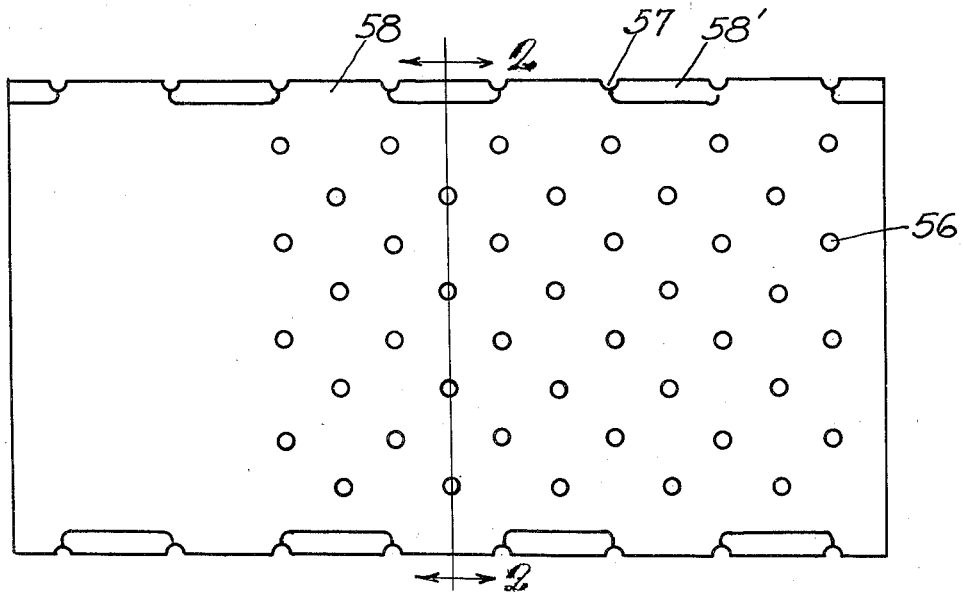
Figure 2 is a view of a blank which has been perforated and provided with mating tongues and recesses along opposite edges preliminary to being formed into a tube.
Figure 3:
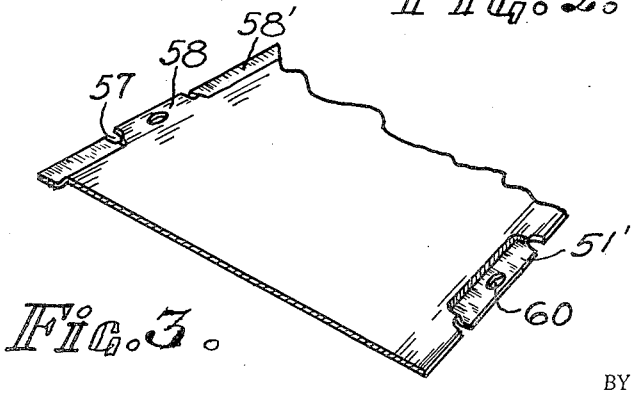
Figure 3 is a cross-sectional view taken on line 2—2 of Figure 2.

The pipe may be imperforate or provided with any number of perforations 56 disposed so that they will be provided throughout the wall of the pipe when it is rolled. Whether or not the pipe is perforated or imperforate depends on the use to which it is to be put. In making a pipe of this novel and improved construction a blank (Figure 2) of the desired size is cut from a strip of sheet metal with a series of recesses 57 formed at spaced intervals along two of the opposing edges which are to be brought in overlapping relation. Between the recesses there are provided tongues 58 which are of similar design but with alternate tongues 58' depressed so that they are in offset relation to adjacent non-depressed tongues, and the depressed tongues on one edge are alternately disposed in relation to the tongues on the opposite edge. Accordingly when the blank is thus formed as shown in Figure 2 and is rolled into tubular form as shown in Figure 1, the edges are adapted to be brought into overlapping relation with the recesses on the opposite edge oppositely disposed thereby permitting the edges to be brought into engagement with both edges preferably overlapping. Much the same result could be produced by depressing all of the tongues, but with alternate tongues oppositely depressed.

The tongues on one edge are not formed by portions cut out of recesses of corresponding size and configuration formed in the opposite edge. Matching of the tongues and recesses on one edge of the tubing with respective recesses and tongues on the other edge is not required, and accordingly the tongues on one edge may differ in configuration and size from the recesses on the other edge of the tubing. These tongues and recesses may be designated as noncomplemental as distinct from complementary tongues and recesses which are matched in size and configuration.

For holding the tubes or pipes in tubular form, preliminary to insertion in the earth or wherever they are to be used, they are preferably secured by any suitable securing means typified herein by rivets 59 inserted in holes 60. Other securing means may be employed or it may be feasible to dispense with them altogether for they function mainly to hold the edges together during handling and are not necessary after the pipe or tube is installed. The tube or pipe may be used for the conveyance of fluids such as water, from place to place, or when perforated they may be employed for draining water out and away from a given area of soil, gravel, stone or similar material and convey it to a certain definite place desired, or they may be used to convey water to a given area which is deficient thereof, thereby irrigating that deficient area. It will be seen that applicant has effected a pipe which is simple and efficient in construction with the abutting edges so constructed and overlapped that any collapsing of the tube is prevented. Furthermore the overlapping edges are brought into relation so that the interior wall of the pipes or tubes is substantially smooth and cylindrical and do not impede the passage of fluid therethrough. It frequently happens that roots of trees searching for water penetrate drainage pipes and stop the flow of the water. The recesses are, therefore, preferably made small in size so that any roots projecting therethrough are ultimately worn or cut off by the sharp edges surrounding the perforations. It may be desired to coat the pipe either before or after its formation with any type of protective, decorative or rust resisting coating material.

While we have shown one embodiment of a tube or pipe and a process for fabricating same, it will be understood that they are not limited to the details of construction set forth but that there may be various changes without departing from the spirit of the invention.

We claim:

1. A process for fabricating a tube comprising providing a blank of predetermined dimensions, removing portions at spaced intervals along two of the opposite edges to provide similar tongues oppositely disposed, depressing alternate tongues on each edge with a depressed tongue on one edge opposite a non-depressed tongue on the other edge, and rolling the blank to bring the tongued edges in overlapping relation with the cut out portions in registration to form a tube.

2. A process for fabricating a tube comprising providing a blank of predetermined dimensions, removing portions at spaced intervals along one of the edges to provide tongues and intervening recesses, depressing one or more of the tongues to offset same in respect to the other tongues, and rolling the blank with the opposite edge fitting within the recesses and overlapping with the tongues to form a tube.

3. A process for fabricating a tube comprising providing a blank of predetermined dimensions, removing portions at spaced intervals along one of the edges to provide tongues and intervening recesses, depressing one or more of the tongues to offset same in respect to the other tongues, rolling the blank with the opposite edge fitting within the recesses and overlapping with the tongues, and swaging one end of the tube for permitting same to mate with the opposite end of a similarly constructed tube.

4. A sheet metal blank having two of its edges brought together and overlapped to form a tube, a plurality of tongues provided on one of the overlapped edges, some of which are offset in relation to others, and a portion removed between the offset tongues and the tongue adjacent thereto to provide a recess.

5. A sheet metal blank having two of its edges brought together and overlapped to form a tube, a plurality of tongues provided on one of the overlapped edges, some of which are offset in relation to others, and a space between the offset tongue and the tongue adjacent thereto to provide a recess having a width exceeding the thickness of the blank.

6. A sheet metal blank having two of its edges brought together and overlapped to form a tube, a plurality of tongues provided on one of the overlapped edges, some of which are offset in relation to others, a space between the offset tongue and the tongue adjacent thereto to provide a recess having a width exceeding the thickness of the blank, and a series of perforations provided in the wall of the tube.

7. A sheet metal blank having two of its edges brought together and overlapped to form a tube, a plurality of tongues of similar conformation provided on one of the overlapped edges, some of which are offset in relation to others, and a space between the offset tongue and the tongue adjacent thereto to provide a recess having a width exceeding the thickness of the blank.

8. A sheet metal blank having two of its edges brought together and overlapped to form a tube, a plurality of tongues of similar conformation provided on both of the overlapped edges, some of which are offset in relation to others and, those offset on one edge being opposite to the non-offset ones on the other edge, and a space between the offset tongue and the tongue adjacent thereto to provide a recess having a width exceeding the thickness of the blank.

9. A process for fabricating a tube comprising providing a blank of predetermined dimensions, providing two of the opposite edges with non-complementary tongues and recesses, and rolling the blank to bring the said two edges in overlapping relation, with the tongues and recesses on one edge registering with respective tongues and recesses on the other edge.

10. A process for fabricating a tube comprising providing a blank of predetermined dimensions, providing two of the opposite edges with tongues and recesses, and rolling the blank to bring the said two edges in overlapping relation, with the tongues and recesses on one edge registering with respective tongues and recesses on the other edge.

11. A process for fabricating a tube comprising providing a blank of predetermined dimensions, providing two of the opposite edges with tongues and recesses, rolling the blank to bring the said two edges in overlapping relation, with the tongues and recesses on one edge registering with respective tongues and recesses on the other edge, and providing recesses through the tube.

12. A process for fabricating a tube comprising providing a blank of predetermined dimensions, providing two of the opposite edges with non-complementary tongues and recesses, rolling the blank to bring the said two edges in overlapping relation, with the tongues and recesses on one edge registering with respective tongues and recesses on the other edge, swaging one end of the tube and providing recesses through said tube.

13. A process for fabricating a tube comprising providing a blank of predetermined dimensions, providing two of the opposite edges with tongues and recesses, rolling the blank to bring the said two edges in overlapping relation, with the tongues and recesses on one edge registering with respective tongues and recesses on the other edge, swaging one end of the tube and providing recesses through said tube.

14. A sheet blank having two of its edges brought together and overlapping to form a tube, and a plurality of non-complemental tongues and recesses provided on one of the overlapping edges for seating the other edge within the recesses between the tongues.

15. A sheet blank having two of its edges brought together and overlapping to form a tube, and a plurality of non-complemental tongues and recesses provided on one of the overlapping edges, tongues and recesses on one edge registering with respective tongues and recesses on the other edge.

16. A sheet blank having two of its edges brought together and overlapping to form a tube, a plurality of non-complemental tongues and recesses provided on one of the overlapping edges for seating the other edge within the recesses between the tongues and a swage provided on one end.

17. A sheet blank having two of its edges brought together and overlapping to form a tube, a plurality of non-complemental tongues and recesses provided on one of the overlapping edges, tongues and recesses on one edge registering with respective tongues and recesses on the other edge, and a swage provided on one end.

18. A perforated sheet blank having two of its edges brought together and overlapping to form a perforated tube, and a plurality of non-complemental tongues and recesses provided on one of the overlapping edges for seating the other edge within the recesses between the tongues.

19. A perforated sheet blank having two of its edges brought together and overlapping to form a perforated tube, and a plurality of non-complemental tongues and recesses provided on one of the overlapping edges, tongues and recesses on one edge registering with respective tongues and recesses on the other edge.

20. A perforated sheet blank having two of its edges brought together and overlapping to form a perforated tube, a plurality of non-complemental tongues and recesses provided on one of the overlapping edges for seating the other edge within the recesses between the tongues and a swage provided on one end.

HOWARD J. LITTLE.
GEORGE W. HINES.